B. P. SAUNDERS.
OIL CAN.
APPLICATION FILED APR. 13, 1920.
1,393,978.
Patented Oct. 18, 1921.
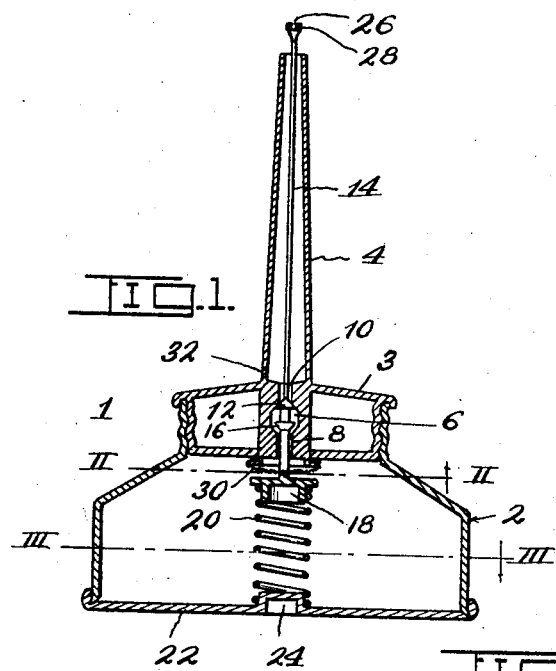
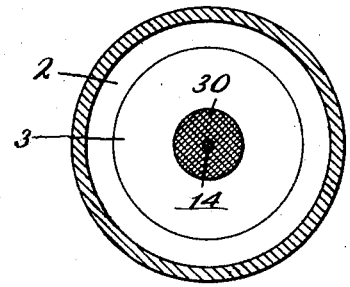
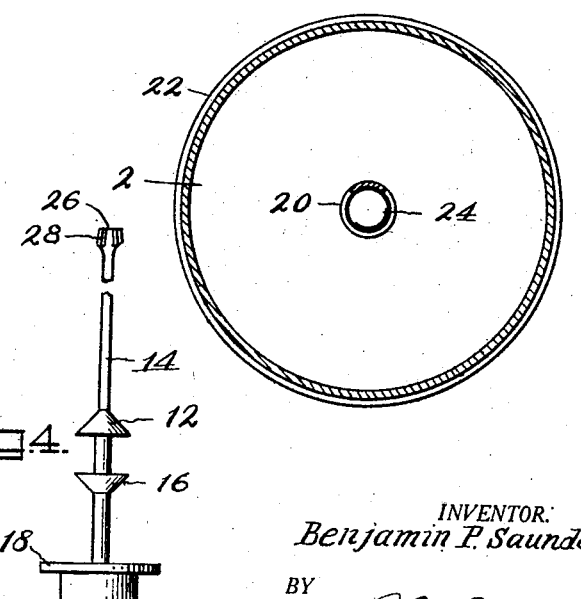
WITNESS:
Fred C. Fischer.
INVENTOR.
Benjamin P. Saunders,
BY
F. G. Fischer,
ATTORNEY.

UNITED STATES PATENT OFFICE.

BENJAMAN P. SAUNDERS, OF WESTON, MISSOURI.

OIL-CAN.

1,393,978. Specification of Letters Patent. Patented Oct. 18, 1921.

Application filed April 13, 1920. Serial No. 373,643.

*To all whom it may concern:*

Be it known that I, BENJAMAN P. SAUNDERS, a citizen of the United States, residing at Weston, in the county of Platte and State of Missouri, have invented certain new and useful Improvements in Oil-Cans, of which the following is a specification.

My invention relates to improvements in oil cans of the type usually employed for holding lubricating oil and applying the same to machine bearings, etc., and one object is to provide an oil can from which the oil cannot escape should said oil can become upset from any cause.

A further object is to provide an oil can which will permit the discharge of only a limited quantity of oil at one time, to the end that armature bearings and the like cannot be readily supplied with an excess of oil likely to injure the armature windings.

In order that the invention may be fully understood, reference will now be had to the accompanying drawing, in which:

Figure 1 is a central, vertical section of an oil can constructed in accordance with the invention.

Fig. 2 is an inverted cross section on line II—II of Fig. 1.

Fig. 3 is a cross section on line III—III of Fig. 1.

Fig. 4 is a fragmentary side elevation of the valves constituting an important feature of the invention.

In carrying out the invention I employ an oil can 1, having a body portion 2, a cap 3 threaded or otherwise removably secured to said body portion 2, and a nozzle 4 fixed to the cap 3 and through which the oil from the body portion 2 is discharged.

The nozzle 4 is equipped with a chamber 6 adapted to hold just sufficient oil for oiling a single bearing. Said chamber 6 is provided at one end with an inlet port 8 and at its opposite end with an outlet port 10, which latter is normally closed by a valve 12.

The valve 12 is fixed to a stem 14 which is provided with a second valve 16 adapted to close the inlet port 8, as will hereinafter appear.

The stem 14 extends through the nozzle 4 and is provided at its inner end with a member 18 embraced by the upper end of a coil spring 20 bearing at its lower end against the bottom 22 of the oil can 1, which has an inwardly pressed portion 24 for engaging and holding the lower end of the spring 20 in place. The outer end of the stem 14 is enlarged as indicated at 26 and has peripheral grooves 28.

30 designates a strainer extending across the entrance to the nozzle 4 to strain out any sediment which may be present in the oil, so that said sediment cannot pass into the nozzle 4.

With the parts arranged as shown and described, it is apparent that should the oil can be upset the oil is prevented from flowing out by the valve 12 which is normally held in closed position by the spring 20. When it is desired to supply a bearing with a few drops of oil the can 1 is turned upside down to permit the oil to fill the chamber 6. The enlarged end 26 of the stem 14 is then placed over the oil hole in the bearing and pressure is applied to the bottom 22 of the can 1 to press the same downwardly against the action of the spring 20 until the valve 12 is opened and the valve 16 is seated over the port 8. The oil in the chamber 2 is then free to flow out through the port 10, while the oil in the body 2 of the can is prevented from entering the chamber 6 by the valve 16. As the oil flows from the outlet port 10 it follows the stem 14 downwardly and enters the oil hole in the bearing through the grooves 28. Should the oil flow too slowly from the nozzle 4 the same may be provided with a minute air port 32 to permit the outer atmosphere to enter and thus equalize the atmospheric pressure within said nozzle 4.

From the foregoing description it will be understood that I have provided an oil can whereby wastage of oil due to upsetting of the can or excessive lubricating of bearings is effectually overcome, and while I have shown and described the preferred construction of my invention, I reserve the right to make such changes as properly fall within the spirit and scope of the claim.

Having thus described my invention, what I claim and desire to secure by Letters Patent, is:

An oil can consisting of a body portion for holding oil, a nozzle communicating with said body portion to conduct oil therefrom, a normally closed valve to prevent the escape of oil through said nozzle should the oil can upset, a stem extending through the nozzle to open the valve, and an enlarged grooved outer terminal on said stem.

In testimony whereof I affix my signature, in the presence of two witnesses.

BENJAMAN P. SAUNDERS.

Witnesses:
F. C. FISCHER,
L. J. FISCHER.